Feb. 28, 1961 A. C. SMITH 2,973,422
PORTABLE SOLDERING IRON
Filed Oct. 1, 1958
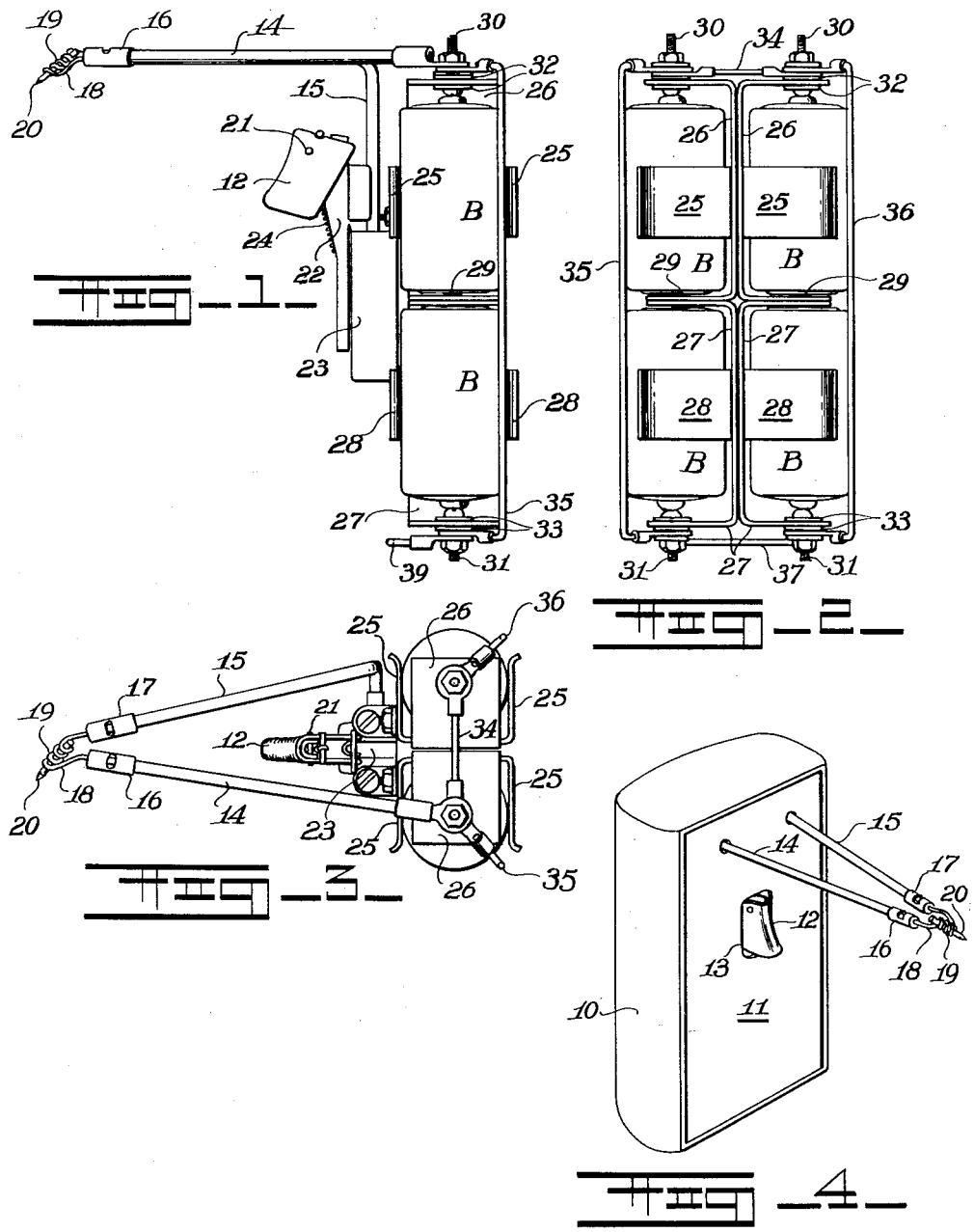
INVENTOR.
Arvel C. Smith
BY
W. B. Harpman
ATTORNEY.

2,973,422
PORTABLE SOLDERING IRON

Arvel C. Smith, 42 Sycamore Drive,
New Middletown, Ohio

Filed Oct. 1, 1958, Ser. No. 764,562

1 Claim. (Cl. 219—26)

This invention relates to a soldering iron and more particularly to a portable soldering iron having an element heated by flashlight batteries.

The pricipal object of the invention is the provision of a small lightweight soldering iron utilizing dry batteries for heating current.

A further object of the invention is the provision of a portable battery operated soldering iron including switch means and a frame adapted to receive and retain flashlight batteries in operative electrical connection with the soldering iron heating element.

A still further object of the invention is the provision of a portable battery operated soldering iron having a heated element and a heating element wrapped thereabout so that an electrical current passed therethrough heats both the heating element and the heated element.

A still further object of the invention is the provision of a portable battery operated soldering iron that may be used as a burning tool and is completely safe with respect to shock hazard.

A still further object of the invention is the provision of a portable battery operated soldering iron that operated on 1½ volt flashlight batteries.

The portable battery operated soldering iron disclosed herein comprises an improvement in soldering irons and more particularly in portable lightweight irons as heretofore known in the art.

The present invention relates to a novel and practical device incorporating means for holding a plurality of 1½ volt flashlight batteries in an assembly including a switch that may be conveniently held in a person's hand. The device includes a pair of projecting arms which terminate in a heating element which is adequately heated by the electrical current from the flashlight batteries to a temperature sufficient to cause regular solder to liquify.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a side view of the soldering iron with the housing removed.

Figure 2 is a back plan view of the soldering iron shown in Figure 1.

Figure 3 is a top plan view.

Figure 4 is a perspective view on a reduced scale.

By referring to Figure 4 of the drawings it will be seen that the soldering iron comprises a housing 10 having a removable panel 11, the housing 10 being arranged to be secured to the panel 11 to hold the housing assembly. A trigger 12 extends through an opening 13 in the panel 11 and a pair of arms 14 and 15 extend through spaced openings in the panel 11 and outwardly with respect thereto and terminate in closely spaced relation to one another and have a pair of connectors 16 and 17 which engage the opposite ends of a Nichrome heating element 18 several convolutions 19 of which are wrapped around a heated element 20.

The housing 10 is of a size enabling it to be held in a person's hand with the fingers wrapped around it so as to position the trigger 12 beneath the forefinger to be actuated thereby.

By referring now to Figures 2 and 3 of the drawings it will be seen that the trigger 12 is pivoted as by a pivot pin 21 to a bracket 22 carried on a switch housing 23 and that the trigger 12 is normally biased by a coil spring 24 to a switch position as shown in Figures 1 and 3. The switch housing 23 contains a snap action single pole switch actuated by the trigger 12 when the same is moved toward the housing 23 as is known in the art. The switch housing 23 is supported on a pair of U-shaped arms 25—25 which are assembled in back to back relation to one another on a pair of elongated U-shaped brackets 26—26 which are also assembled in back to back relation to one another and secured in superimposed relation to a duplicate assembly of secondary U-shaped brackets 27—27 which in turn carry a pair of secondary U-shaped arms 28—28. The adjacent ends of the elongated U-shaped brackets 26—26 and secondary elongated U-shaped brackets 27—27 are riveted to one another, as at 29—29, and the rivets thereby provide terminals against which the bottoms of four dry cell batteries B may be engaged. The opposite ends of the dry cell batteries B, which are ordinary flashlight size, are engaged against the heads of fasteners 30—30 and 31—31 respectively. The fasteners 30—30 and 31—31 are insulated from the brackets 26 and 27 by insulation members 32 and 33 respectively. The fasteners 30 and 31 provide means for connecting the plurality of batteries B to the arm 14 by providing connections for electrical conductors 34, 35, 36 and 37 respectively. The arm 15 extends from the switch in the switch housing 23 and the circuit is completed through the switch and the U-shaped arms 25—25 and U-shaped brackets 26—26 and 27—27. It will thus be seen that the brackets 26—26 and 27—27 in addition to holding the batteries B provide an essential part of the conductor circuits capable of carrying the electrical energy from the batteries B to the heating element 18 and the heated element 20. The conductors 35 and 36 are positioned so as to permit the batteries B to be moved into and out of position in the U-shaped arms 25—25 and 28—28 and so that they act as secondary retainer means for the batteries preventing them from moving out of their desired positions.

The heating element 18 is preferably formed of five convolutions of 20 gauge Nichrome resistor wire and the heated element 20 is formed of a pointed section of 12 gauge copper Buss wire. The wiring arrangement as just described is arranged to carry a 50 watt 5 ohm current from the 1½ volt dry batteries which are connected in parallel.

Those skilled in the art will note that the device of the invention is so formed that the structural portions thereof which form the assembly act as heavy duty high capacity current conductors so that all of the energy available in the batteries is delivered to the heating element 18 and the heating action occasioned is that of the resistance of the heating element 18 to flow of electrical current therethrough as well as the flow of current through the heated element 20 around which the heating element 18 is formed in several convolutions as hereinbefore described. The heating energy delivered to the heated element 20 is sufficient to melt ordinary solder such as used in soldering electrical connections and the like and to heat the work pieces to be soldered so as to insure a satisfactory solder bond.

It will thus be seen that a portable soldering iron actuated by flashlight batteries has been disclosed which comprises a highly useful tool where portability is desirable and where regular 115 volt alternating current is not readily available. It will occur to those skilled in the art that by varying the design of the assembly of the U-shaped arms 25 and 28 and the U-shaped brackets 26 and 27 additional batteries may be incorporated to increase the capacity thereof if desired and without departing from the invention disclosed.

It will be seen that the portable soldering iron disclosed herein meets the several objects of the invention and having described my invention, what I claim is:

A portable soldering iron having a body structure for holding a plurality of dry cell batteries and mounting a switch and a pair of structural supports for a heated element; said body structure comprising two superimposed pairs of vertically positioned brackets having oppositely disposed outturned ends, each pair of brackets being arranged in back to back relation, the lower outturned ends of the uppermost pair of brackets being riveted to the upper outturned ends of the lowermost pair of brackets, two pairs of U-shaped clamping arms, each pair being arranged in back to back relation, one of said pairs of U-shaped clamping arms being attached to the backs of the uppermost pair of said brackets and the other pair of U-shaped clamping arms being attached to the backs of the lowermost pair of said brackets, said switch mounted on the adjacent sides of one of said pairs of U-shaped clamping arms and electrically connected therethrough to said superimposed pairs of brackets, terminals positioned through the uppermost outturned ends of said uppermost pair of brackets and insulated with respect thereto and secondary terminals positioned through the lowermost outturned ends of said lowermost pair of brackets and insulated with respect thereto, conductors electrically connecting said terminals and a secondary conductor electrically connecting one of said structural supports with said switch whereby dry cell batteries positioned between the outturned ends of each of said brackets complete circuits through said terminals, switch, structural supports and said heated element.

References Cited in the file of this patent

UNITED STATES PATENTS

| | | |
|---|---|---|
| 2,301,775 | Goettie | Nov. 10, 1942 |
| 2,727,132 | Hills | Dec. 13, 1955 |
| 2,737,570 | Aita | Mar. 6, 1956 |

FOREIGN PATENTS

| | | |
|---|---|---|
| 116,344 | Australia | Dec. 22, 1942 |
| 118,511 | Australia | May 11, 1944 |
| 549,862 | France | Nov. 29, 1922 |